(12) United States Patent
Zigmond

(10) Patent No.: US 7,614,064 B2
(45) Date of Patent: Nov. 3, 2009

(54) DETERMINING PROGRAM BOUNDARIES THROUGH VIEWING BEHAVIOR

(75) Inventor: Daniel J. Zigmond, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 858 days.

(21) Appl. No.: 10/923,955

(22) Filed: Aug. 23, 2004

(65) Prior Publication Data

US 2006/0041902 A1    Feb. 23, 2006

(51) Int. Cl.
*H04N 60/33* (2006.01)
(52) U.S. Cl. .............................. 725/9; 725/13; 725/14; 725/87; 725/88; 725/91
(58) Field of Classification Search .................... 725/10, 725/9, 13, 14, 16, 87, 88, 91
See application file for complete search history.

(56) References Cited

U.S. PATENT DOCUMENTS

2003/0093790 A1 *  5/2003  Logan et al. .................. 725/38

2004/0045020 A1 *  3/2004  Witt et al. ..................... 725/13

OTHER PUBLICATIONS

"Automatic detection of TV Commercials", Satterwhite et al., IEEE Potentials, vol. 23, No. 2, Apr./May 2004, pp. 9-12.

* cited by examiner

*Primary Examiner*—John W Miller
*Assistant Examiner*—Sumaiya A Chowdhury
(74) *Attorney, Agent, or Firm*—Lee & Hayes, PLLC

(57) ABSTRACT

Program boundaries are determined through viewing behavior. More specifically, edge and/or commercial boundaries of programs may be determined by monitoring viewing behavior of different video segments using forward and backward correlations between video segments. In a described implementation, a video portion is divided into segments. To monitor the viewing of the video portion, whether each particular segment is played by a viewer (as compared to being unviewed or viewed in an accelerated manner) is tracked for a number of different viewers. For each segment, correlations with previous and subsequent segments are calculated based on viewership. The segments may then be categorized. A segment that is strongly correlated with subsequent segments but not previous segments is categorized as a starting segment. A segment that is strongly correlated with previous segments but not subsequent segments is categorized as an ending segment. Middle and island segments may also be categorized.

38 Claims, 4 Drawing Sheets

DETERMINING PROGRAM BOUNDARIES THROUGH VIEWING BEHAVIOR

TECHNICAL FIELD

This disclosure relates in general to determining program boundaries through viewing behavior and in particular, by way of example but not limitation, to determining edge and/or commercial boundaries of programs through monitoring viewing behavior and determining correlations between viewed video segments.

BACKGROUND

A major potential benefit of digital video recording (DVR) is that it can free viewers from being tied to their TVs at particular times in order to watch particular programs on broadcast television. To actually deliver this benefit, however, viewers have to trust that the shows they want to watch will be recorded practically invariably. Unfortunately, DVR schemes have historically tended to encounter significant problems accurately recording shows. Shows that are particularly difficult to accurately record include live shows, such as sporting events or award shows. These shows often extend beyond their scheduled time, which results in their endings being unrecorded. This incorrect and incomplete recording is extremely frustrating to viewers.

Two attempted solutions have been tried in the past, but both have provided unsatisfactory results. A first attempted solution has been to disseminate live schedule updates to indicate that the end time of a given show has changed. However, this is a labor-intensive process, which involves a human watching the show in order to send the updates. A second attempted solution has been to over-compensate by extending the recording time of all live events. This often works, but it wastes significant storage resources. This second attempted solution also fails to accurately record shows in the worst cases, such as when an award show or a baseball game runs two hours over its scheduled time period. Moreover, neither solution facilitates playback of the recorded show.

Accordingly, there is a need for schemes and/or techniques that can accurately record shows and/or facilitate playback of recorded shows.

SUMMARY

Program boundaries are determined through viewing behavior. More specifically, edge and/or commercial boundaries of programs may be determined by monitoring viewing behavior of different video segments using forward and backward correlations between video segments. In a described implementation, a video portion is divided into segments. To monitor the viewing of the video portion, whether each particular segment is played by a viewer (as compared to being unviewed or viewed in an accelerated manner) is tracked for a number of different viewers. For each segment, correlations with previous and subsequent segments are calculated based on viewership. The segments may then be categorized. A segment that is strongly correlated with subsequent segments but not previous segments is categorized as a starting segment. A segment that is strongly correlated with previous segments but not subsequent segments is categorized as an ending segment. A segment that is strongly correlated with both previous and subsequent segments is categorized as a middle segment. And a segment that is not strongly correlated with either previous or subsequent segments is categorized as an island segment.

Other method, system, approach, apparatus, server/headend, client device, media, procedure, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction

Boundaries of digital video streams, such as those that contain broadcast programs, are determined by analyzing viewer behavior. These program boundaries may be, for example, edge boundaries (e.g., starting and ending points) and/or commercial boundaries. A digital video stream is divided into segments. The playing behavior of multiple viewers is monitored to track which segments of the digital video stream each particular viewer plays (e.g., as opposed to cueing over or not viewing). Correlations for each segment are calculated with respect to previous and subsequent segments and with regard to whether the segments were played. The correlation results enable the segments to be categorized.

By way of example only, four categories may be defined based on viewership: starting, ending, middle, or island. A segment is categorized as a starting segment if it (e.g., if the viewership thereof) is strongly correlated with subsequent segments but not with previous segments. A segment is categorized as an ending segment if it is strongly correlated with previous segments but not with subsequent segments. A segment is categorized as a middle segment if it is strongly correlated with both previous and subsequent segments. A segment is categorized as an island segment if it fails to be strongly correlated with either previous or subsequent segments. After the starting segment is determined, a DVR may initially stream, display, etc. the digital video stream from the starting segment for a requesting user. Additionally, the DVR may skip commercial portions of the digital video stream after identifying them from sets of contiguous island segments.

EXAMPLE ENVIRONMENT FOR DETERMINING PROGRAM BOUNDARIES

Figure 1:
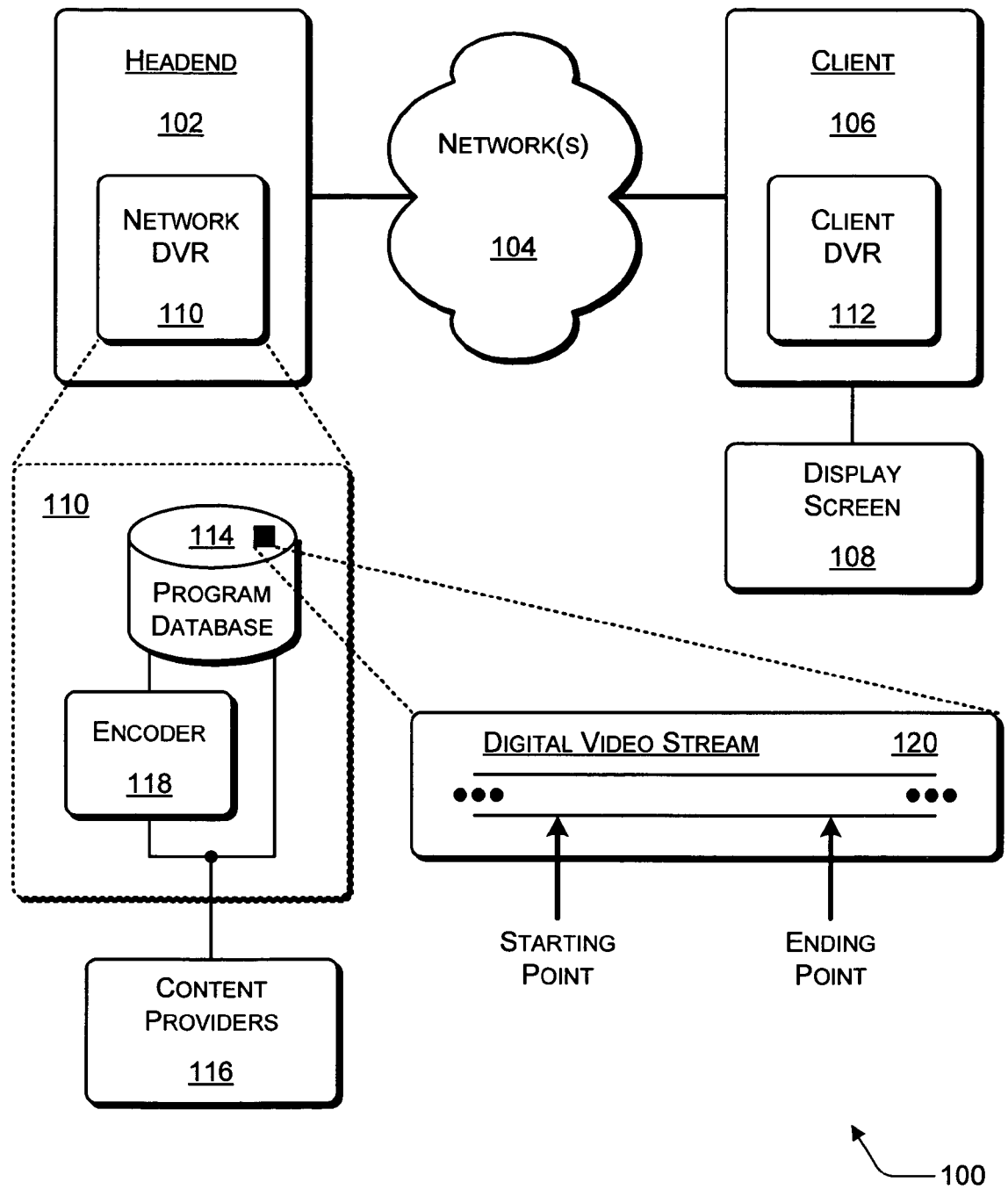
FIG. 1 is a block diagram illustrating an example of a DVR environment in which a digital video stream is recorded.

FIG. 1 is a block diagram illustrating an example of a DVR environment 100 in which a digital video stream 120 is recorded. DVR environment 100 includes a headend 102, a client 106, and one or more networks 104. Headend 102 provides video content to multiple clients 106 via network 104. Network 104 may be realized as a cable network, a public network, the internet, a local area network (LAN) or wide area network (WAN), a wired or wireless network, some combination thereof, and so forth.

Headend 102 is usually realized as a server constructed from one or more physical processing devices or a similar hardware system that is a capable of disseminating video data over network 104 to multiple clients 106. An example of a suitable headend 102 is described further below with reference to FIG. 3.

In a described implementation, client 106 is realized as a television-based device such as a set-top box. However, client 106 may alternatively be realized as a personal computer, a personal digital assistant (PDA), a mobile appliance, or any other electronic device that is capable of processing video data. A display screen 108 is integral with or connected to (wirelessly or by wire) client 106. Video data that is received from headend 102 via network 104 at client 106 may be displayed on display screen 108. Alternatively, client 106 may receive television content through a separate and different communication channel (not shown), especially in an alternative implementation in which client 106 reports viewing behavior to headend 102. Client 106 is typically adapted to also process any audio data accompanying the video data.

As illustrated, headend 102 includes a network DVR 110, and client 106 includes a client DVR 112. Thus, both headend 102 and client 106 are shown as including a DVR. However, either headend 102 or client 106 (but not necessarily both) may alternatively include a DVR. Use of client DVR 112 is particularly relevant in an alternative implementation in which client 106 reports viewing behavior to headend 102; this implementation is described further herein below.

In a described implementation and as illustrated in DVR environment 100, headend 102 receives video data from content providers 116. Video data that is received from content providers 116 in a digital format is stored in program database 114. Video data that is received from content providers 116 in an analog format is first passed through encoder 118 to encode it into a digital format prior to storing it in program database 114. In this manner, video data may be stored in a compressed form in program database 114 in order to avoid inefficiently using the storage resources of program database 114.

By using even a relatively-modern video codec, a month of programming for possibly hundreds of channels can be stored at program database 114 for subsequent extraction and presentation by network DVR 110. Alternatively, shows may be retained based on popularity. For example, shows such as newscasts, which are rarely requested as little as 30 minutes to 24 hours after the original broadcast time, may be expunged from program database 114 daily. Shows of medium popularity may be retained for one to two weeks, and shows of substantial popularity may be retained for two months.

A digital video stream 120 is specifically illustrated as being stored in program database 114. From the perspective of network DVR 110, digital video stream 120 is merely a continuous flow of digital data with no particular beginning points, stopping points, programming boundaries, and so forth. Network DVR 110 extracts a given show (e.g., "Funny Sitcom", which is broadcast Thursdays from 8:00 p.m. to 8:30 p.m. on National Corporate Network (NCN)) from digital video stream 120 using a corresponding time index or similar mechanism.

Consequently, network DVR 110 extracts Funny Sitcom by locating along digital video stream 120 the portion thereof corresponding to the 8:00 to 8:30 p.m. timeslot on Thursday. However, the actual program Funny Sitcom may not be present at the expected 8:00 to 8:30 p.m. timeslot. The reasons are many: an earlier program (e.g., golf playoff) may have run longer than expected, clocks may not be carefully synchronized, NCN may be airing an oversized episode of Funny Sitcom that lasts 42 minutes without providing ample scheduling notice, and so forth.

As noted above, a human operator may constantly watch a channel and provide real-time updates as to the start and end times of each program. However, this manual approach is labor intensive. As another option, network DVR 110 may automatically extract a portion of digital video stream 120 that corresponds to 7:58 p.m. to 8:32 p.m. Although this overcompensation approach is typically effective, it can be annoying to a user that requests Funny Sitcom and does not want to first watch part of a preceding program (e.g., the closing credits), previews for the preceding program or other shows of the requested channel, two to three minutes or more of commercials, and so forth.

However, as described further herein, a more accurate starting point (and ending point) for a requested program along digital video stream 120 may be ascertained by determining program edge boundaries through monitoring viewing behavior. Consequently, network DVR 110 may begin the streaming of a requested program at the determined starting point. This reduces user waiting time, at least down to the granularity level of the segments of digital video stream 120. Determining commercial boundaries of the requested program of digital video stream 120 also enables network DVR 110 to index the commercials of a given program and then skip/omit the identified commercials when streaming the given program.

EXAMPLES OF DETERMINING PROGRAM BOUNDARIES THROUGH VIEWING BEHAVIOR

Figure 2:
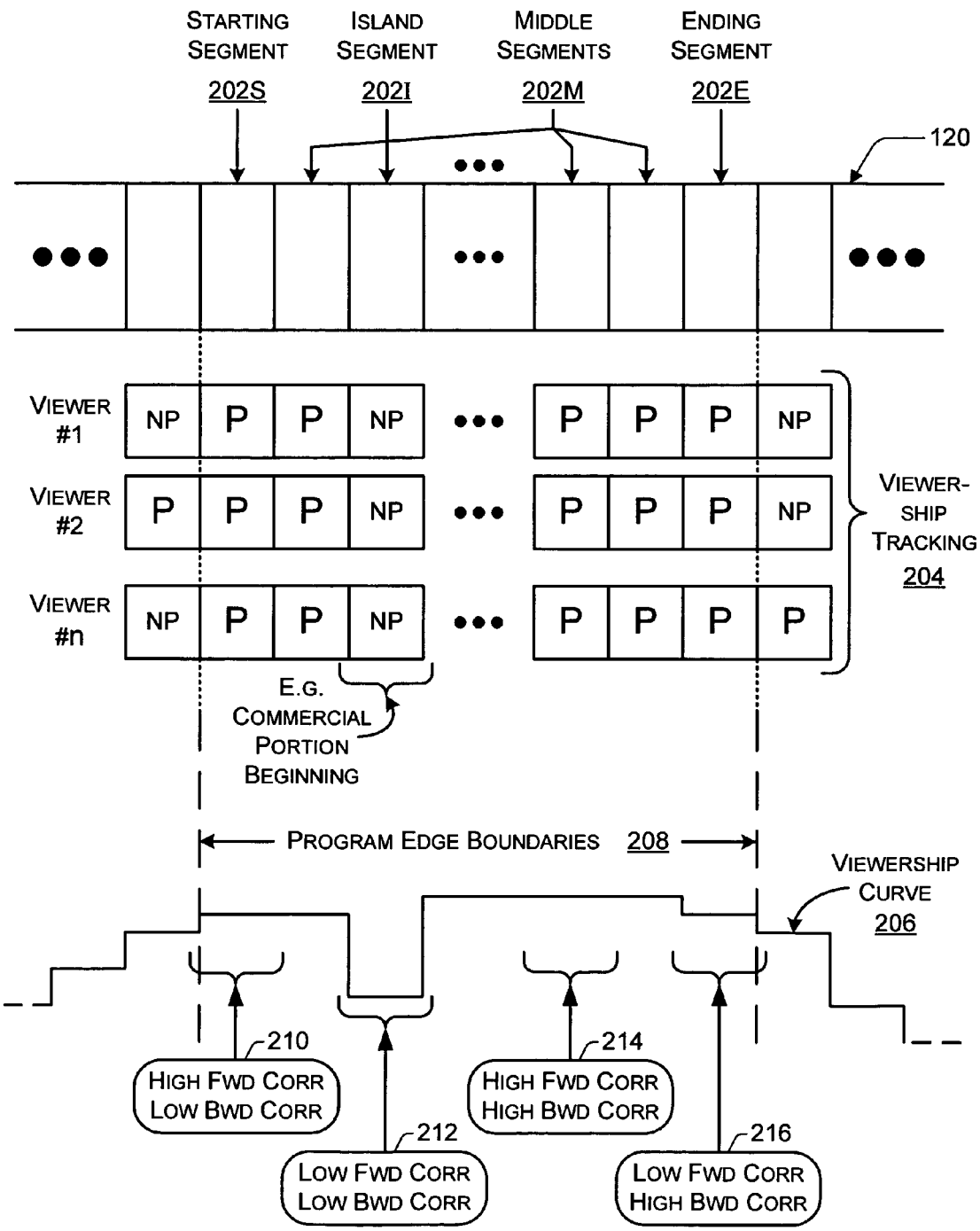
FIG. 2 illustrates an example of a digital video stream that has been segmented, with program edge boundaries thereof being determined from the tracking of viewed segments.

FIG. 2 illustrates an example of a digital video stream 120 that has been segmented, with program edge boundaries 208 thereof being determined from the tracking 204 of viewed segments. Digital video stream 120 is segmented or divided into segments 202.

The length of segments 202 may be chosen based on desired results, communication bandwidth constraints, processing capabilities, some combination thereof, and so forth. By way of example only, the length of each segment 202 may be established to be of any duration from one second to three minutes. In a described implementation, the selected segment length is 10 seconds. Ten seconds is small enough to enable identification of commercials (including portions thereof) and is also likely to be considered a reasonable initial wait period by most users. Five second segments may alternatively be used so that the newer 15 second commercials can also be accurately identified.

In a described implementation, headend 102 (of FIG. 1) transmits digital video stream 120 over network 104 to client 106 responsive to a user input request to play a program thereof using network DVR 110. Other user input requests are also serviced by network DVR 110. Such other user inputs include requests to accelerate the playing of digital video stream 120 in the forward direction (e.g., cueing) and in the reverse direction (e.g., reviewing). Because digital video stream 120 is located in program database 114 at headend 102 and streamed (e.g., played, cued, reviewed, stopped, etc.) via network DVR 110, headend 102 can track 204 the viewership of digital video stream 120.

Viewership tracking 204 is performed for each of multiple viewers #1, #2 . . . #n. As illustrated in FIG. 2, when a viewer is playing digital video stream 120 for any given segment, headend 102 notes that that given segment is being played as indicated by the "P". When a viewer is not playing digital video stream 120 (e.g., the viewer has activated a cue or review feature or the streaming has been indefinitely stopped) for or at a given segment, headend 102 notes that the given segment is not being played as indicated by the "NP".

Correlations are then calculated from this tracked viewership 204. Viewership curve 206 graphically represents the tracked viewership 204. In one implementation, viewership curve or graph 206 represents sums of the tracked plays on a per segment basis. Correlations for each segment 202 with respect to other segments 202 may then be calculated from these sums. Examples of correlations, including backward and forward calculations, are described further herein below. In another implementation, viewership curve 206 represents an average of the results of correlation calculations that have been made for each viewer's individual tracked viewership 204 (1, 2 . . . n) on a per segment basis. The former implementation is computationally less intensive.

For each individual segment 202, a forward correlation and a backward correlation is calculated with regard to tracked viewership 204. If a segment has a high forward correlation and a low backward correlation 210, the segment is categorized as a starting segment 202S. If a segment has a low forward correlation and a low backward correlation 212, the segment is categorized as an island segment 202I. If a segment has a high forward correlation and a high backward correlation 214, the segment is categorized as a middle segment 202M. If a segment has a low forward correlation and a high backward correlation 216, the segment is categorized as an ending segment 202E.

Starting segment 202S and ending segment 202E, as the edge boundaries for the program being measured, delineate program edge boundaries 208. After program edge boundaries 208 have been determined, when headend 102 receives a client request to play the corresponding program, network DVR 110 may begin the corresponding program at starting segment 202S, and optionally terminate the program at ending segment 202E. If commercial boundaries are delineated using island segments 202I, network DVR 110 may also skip commercial portions of digital video stream 120.

CORRELATION CALCULATION EXAMPLES

An example implementation for forward and backward correlations is described in this section. The correlation between two segments $S_x$ and $S_y$ is represented as $C(S_x, S_y)$. The correlation $C(S_x, S_y)$ may be calculated in accordance with any given correlation. Examples include, but are not limited to, Pearson's r (Pearson's Product Moment Correlation Coefficent), Spearman's rho, and so forth. An example of a correlation equation for an example correlation type is:

$$r = \frac{N\sum XY - (\sum X)(\sum Y)}{\sqrt{(N\sum X^2 - (\sum X)^2)(N\sum Y^2 - (\sum Y)^2)}}. \tag{1}$$

The forward correlation for a segment $S_n$ is represented as $C_f(S_n)$, and it may be calculated using equation (2) below. The backward correlation for a segment $S_n$ is represented as $C_b(S_n)$, and it may be calculated using equation (3) below.

In both correlation directions, for some number of segments l (the calculation "length"), the segment correlations (either forward or backward) are summed. In a described implementation, each segment correlation is weighted by its proximity to the original segment. More than one segment is considered instead of merely the immediately adjacent segments in case the immediately adjacent segments are special cases (e.g., commercial potions, which many viewers might skip).

The value for the calculation length l may be fixed. Alternatively, the calculation length l may vary. For example, the calculation length l might be selected responsive to the expected duration of the program that is (or is thought to be) being measured (e.g., based on a published schedule). An acceptable example approach to selecting the calculation length l is to take some fraction (e.g., one-third) of the expected duration of the underlying program.

For example, for a 30 minute program, one-third of the duration is 10 minutes. Thus, the forward and backward correlation calculations extend 10 minutes in the forward and backward directions. For this 10 minute example, if each segment is one minute long, then the calculation length l is equal to 10. If each segment is 10 seconds long, then the calculation length l is equal to 60.

An example equation for calculating the forward correlation $C_f(S_n)$ is provided by equation (2):

$$C_f(S_n) = \sum_{i=1}^{l} \frac{1}{i} C(S_n, S_{n+i}). \tag{2}$$

And an example equation for calculating the backward correlation $C_b(S_n)$ is provided by equation (3):

$$C_b(S_n) = \sum_{i=1}^{l} \frac{1}{i} C(S_n, S_{n-i}). \tag{3}$$

Segment $S_n$ may be considered the primary segment being categorized. The other segments $S_{n+i}$ and $S_{n-i}$ may be considered secondary segments with respect to the primary segment $S_n$ that is being categorized.

Using the results of the forward and backward correlation calculations, if $C_f(S_n)$ exceeds a predetermined forward threshold while $C_b(S_n)$ does not exceed a predetermined backward threshold, segment $S_n$ is categorized as a start segment. If the inverse is true (i.e., $C_b(S_n)$ exceeds the predetermined backward threshold while $C_f(S_n)$ does not exceed the predetermined forward threshold), segment $S_n$ is categorized as an end segment. If both $C_f(S_n)$ and $C_b(S_n)$ exceed their respective predetermined thresholds, segment $S_n$ is categorized as a middle segment. If neither exceeds its respective predetermined threshold, segment $S_n$ is categorized as an island segment.

Although described above as separate thresholds (e.g., a predetermined forward threshold and a predetermined backward threshold), there may instead be a single threshold, or equivalently two thresholds having the same value. An example value for the thresholds is 0.9, but other values may alternatively be used, perhaps as determined through additional experimentation.

EXAMPLES OF DEVICES AND METHODS FOR DETERMINING PROGRAM BOUNDARIES THROUGH VIEWING BEHAVIOR

Figure 3:
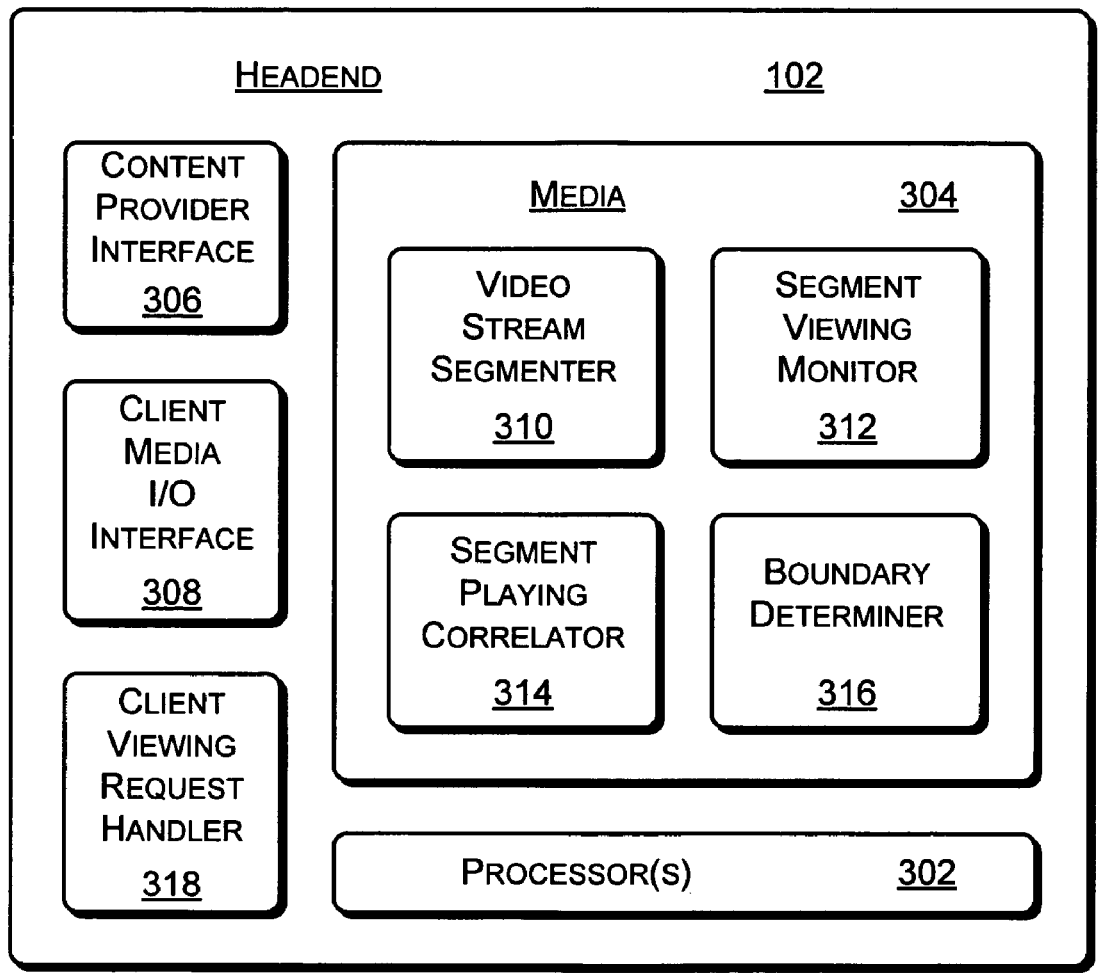
FIG. 3 is a block diagram of an example of a headend that is capable of determining program boundaries by monitoring viewer behavior.

FIG. 3 is a block diagram of an example of a headend 102 that is capable of determining video boundaries by monitoring viewer behavior. Headend 102 may be, more generally, any server that is capable of streaming video to one or more clients 106 (of FIG. 1). For example, in addition to network cable providers, a server on the internet may perform the described determining of program boundaries through viewing behavior.

Headend 102 includes one or more processors 302 and media 304. Headend 102 also includes a content provider interface 306, a client media input/output (I/O) interface 308, and a client viewing request handler 318. Content provider interface 306 receives program content (e.g., digital and/or analog audio/video data) from content providers 116 (of FIG. 1). Client media I/O interface transmits audio and video data (e.g., digital video stream 120) to clients, such as client 106, over network 104. Client transmissions, including requests to play, stop, and/or view video at an accelerated data rate, are received by headend 102 via client media I/O interface 308. Requests from a client 106 to play, stop, view video at an accelerated rate, etc. are handled by client viewing request handler 318. Although not explicitly illustrated as part of media 304, client viewing request handler 318 may be comprised fully or partially of processor-executable instructions.

Media 304 includes processor-executable instructions that are executable by processor(s) 302 to effectuate functions of headend 102. More generally, processor-executable instructions may comprise hardware, software, firmware, or some combination thereof, and so forth. Media 304 may be realized as volatile and/or nonvolatile memory. More generally, media 304 may be volatile or non-volatile media, removable or non-removable media, storage or transmission media, some combination thereof, and so forth.

As illustrated, media 304 includes a video stream segmenter 310, a segment viewing monitor 312, a segment playing correlator 314, and a boundary determiner 316. In a described implementation, video stream segmenter 310 is adapted to divide video streams into segments that correspond to discrete time units and that can be monitored individually. The segments need not correspond to any particular portions of the compressed video stream. By way of example, digital video stream 120 (of FIG. 2) may be segmented into segments 202.

Segment viewing monitor 312 is adapted to monitor the viewing behavior of clients 106. For example, the viewing of video streams by multiple clients 106 may be tracked 204 as to whether segments 202 are being played or not played. Viewership tracking 204 may also be more finely tracked over a greater number of viewing functions. For instance, viewing functions may be divided into play, stop, accelerated viewing (e.g., cue and review), and so forth.

Because headend 102 is actively streaming digital video stream 120 from network DVR 110 to client 106, client viewing request handler 318 detects or knows whether any given segment 202 is being played (or, more generally, how/if any given segment 202 is being viewed). This viewing information is provided from client viewing request handler 318 to segment viewing monitor 312, which tracks the viewing information over multiple segments 202 for an expected program of digital video stream 120.

Segment playing correlator 314 accepts the tracked viewership information 204 from segment viewing monitor 312. Segment playing correlator 314 is adapted to calculate at least one correlation for each given segment with regard to whether a particular client 106 plays both the given segment and other segments of some predetermined proximity. For example, segment playing correlator 314 may implement the forward correlation equation (2) and the backward correlation equation (3) for each segment to be categorized to produce a forward correlation value and a backward correlation value, respectively for each segment being categorized.

Boundary determiner 316 is adapted to analyze the correlation results from segment playing correlator 314 and to determine one or more boundaries of a program being measured. These boundaries may be program edge boundaries, program commercial boundaries, and so forth. For example, boundary determiner 316 may categorize each respective segment according to the respective values of the forward and backward correlation analyses 210, 212, 214, 216. More specifically, boundary determiner 316 may categorize or identify each segment as being a starting segment 202S, an island segment 202I, a middle segment 202M, an ending segment 202E, and so forth. The overall starting and ending segments 202S and 202E identify program edge boundaries 208.

Generally, internal starting and ending segments 202 may identify commercial periods. More specifically, a set of adjacent island segments 202I may identify a commercial portion of digital video stream 120. Optionally, headend 102 may index the identified commercial portions for a program of digital video stream 120. Subsequently, when playing the program for a client 106, the commercials may be omitted using the index. The omission may be automatic or upon request by the client.

Segments may be 10 seconds in duration to enable the identification of commercials, including commercial portions, of lengths of 30 seconds and multiples thereof. Furthermore, segments may be 5 seconds in duration to enable the identification of commercials, including commercial portions, of lengths of 15 seconds and multiples thereof. Contiguous island segments 202I (e.g., those with both a low backward and a low forward correlation) may be amalgamated into one or more island zones. These island zones may be identified as commercial portions, especially if the island zones are selected to be of a length that is equivalent to an expected commercial length or a multiple thereof.

Thus, island zones corresponding to commercial portions may be identified by amalgamating island segments 202I that are contiguous, and optionally with regard to an expected commercial length. As an alternative, island segments 202I may be amalgamated into island zones using a correlation approach. Island segments 202I are island segments on a relatively macro scale, such as is reflected by the calculation length l. However on a micro scale, such as may be reflected by an expected commercial length or a low multiple thereof, such segments have high correlations with reference to proximate segments and with regard to accelerated viewing. In other words, commercial portions may be identified by detecting contiguous segments that are viewed at an accelerated rate with a sufficiently high and/or low backward and forward correlation threshold pair.

Figure 4:
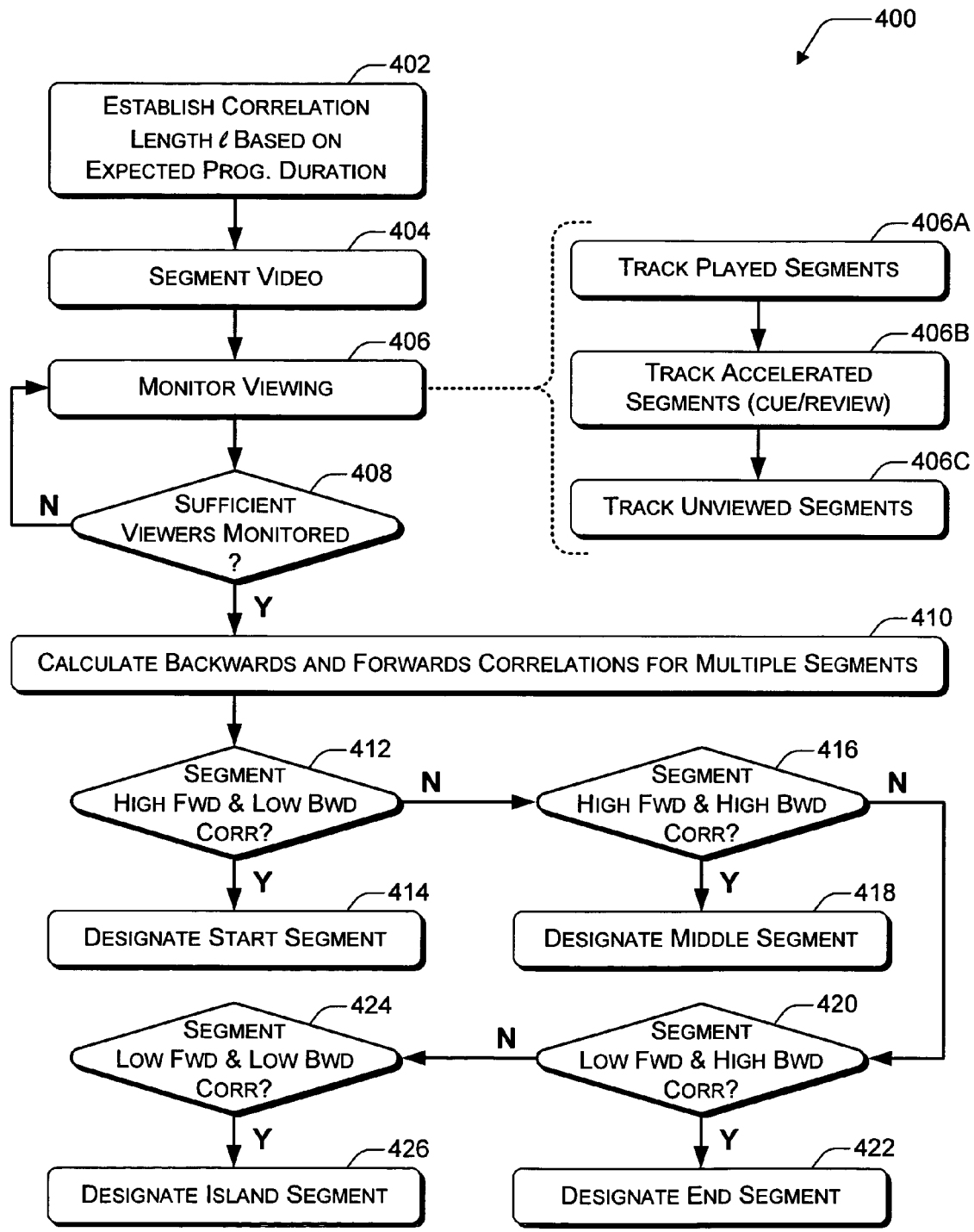
FIG. 4 is a flow diagram that illustrates an example of a method for determining program boundaries through viewing behavior.

FIG. 4 is a flow diagram 400 that illustrates an example of a method for determining video boundaries through viewing behavior. Flow diagram 400 includes sixteen (16) blocks 402-426 and 406A-406C. Although the actions of flow diagram 400 may be performed in other environments and with a variety of hardware and software implementations, FIGS. 1-3 are used in particular to illustrate certain aspects and examples of the method. For example, a headend 102 may perform the actions of flow diagram 400.

At block 402, a correlation length l, which is based on an expected duration of a program being measured, is established. For example, a correlation length l may be established that is equal to one-third of an expected duration of a program being measured. At block 404, a video is segmented. For example, a digital video stream 120 may be divided into segments 202 by video stream segmenter 310.

At block 406, client viewing is monitored. For example, the viewership of multiple clients 106 may be monitored and tracked 204 on a per-segment basis by segment viewing monitor 312. At block 406A, segments that are played are tracked; at block 406B, segments that are viewed at an accelerated rate (e.g., cued or reviewed) are tracked; at block 406C, segments that are not viewed are tracked. For example, client viewing request handler 318 may provide viewing information related to playing, stopping, and accelerated viewing on a per-segment basis to segment viewing monitor 312.

At block 408, it is ascertained if a sufficient number of viewers have been monitored. For example, it may be ascertained whether a sufficient number of viewers have been monitored via their clients 106 such that program boundaries may be determined to some acceptable degree of likelihood. This sufficient number may be discovered through experimentation and may vary by program type. If a sufficient number have not been monitored, then the method of flow diagram 400 continues at block 406 to continue viewership monitoring. If, on the other hand, a sufficient number of viewers have been monitored (as ascertained at block 408), then correlations may be calculated at block 410.

At block 410, backwards and forwards correlations for multiple segments are calculated. For example, a forward correlation calculation (e.g., using equation (2)) and a backward correlation calculation (e.g., using equation (3)) for each segment 202 may be performed by segment playing correlator 314 utilizing the tracking 204 of the played segments for multiple clients 106.

At blocks 412-426, segments are categorized using the calculated forward and backward correlation values. For example, each segment 202 may be categorized or identified as a starting segment 202S, an island segment 202I, a middle segment 202M, or an ending segment 202E by boundary determiner 316.

At block 412, it is determined if a segment being categorized has a high forward correlation and a low backward correlation. For example, forward correlation values and backward correlation values may be compared to one or more correlation thresholds (e.g., the backward and forward predetermined thresholds as described herein above) to determine whether they are relatively high or low. At block 414, the segment is designated a start segment if the forward correlation is high and the backward correlation is low.

If not, it is determined at block 416 if the segment has a high forward correlation and a high backward correlation. If so, the segment is designated at block 418 to be a middle segment. If not, then it is determined at block 420 if the segment has a low forward correlation and a high backward correlation. If so, the segment is designated at block 422 to be an end segment. If not, then it is determined at block 424 if the segment has a low forward correlation and a low backward correlation. If so, the segment is designated at block 426 to be an island segment.

As described above, viewership is tracked 204 by headend 102 without using additional communications because client viewing request handler 318 is implicitly informed of viewing habits inasmuch as clients 106 request viewing functions to be performed by network DVR 110. In a client DVR 112 environment, however, viewer requests to play, stop, and accelerate video are handled locally by client 106 using client DVR 112. Nevertheless, program boundaries may still be determined by monitoring viewing behavior.

Each client 106 can report to headend 102 (e.g., to segment viewing monitor 312) which segments are being played, accelerated over, and so forth. This reporting may be effectuated during the viewing of a program being measured or after a viewer has completed the entire program. Regardless, after a sufficient number of clients 106 have reported the viewing behavior of their users, segment playing correlator 314 may calculate correlation equations and boundary determiner 316 may determine program edge boundaries 208. Headend 102 may then advise (e.g., other) clients 106 of the starting segment 202S and ending segment 202E of these program edge boundaries 208. These local client DVRs 112 can then start requested programs at starting segment 202S. Commercial skipping with client DVRs 112 may be accomplished in an analogous manner.

The devices, actions, aspects, features, procedures, components, etc. of FIGS. 1-4 are illustrated in diagrams that are divided into multiple blocks. However, the order, interconnections, interrelationships, layout, etc. in which FIGS. 1-4 are described and/or shown is not intended to be construed as a limitation, and any number of the blocks can be modified, combined, rearranged, augmented, omitted, etc. in any manner to implement one or more systems, methods, devices, procedures, media, apparatuses, servers, clients, arrangements, etc. for determining program boundaries through viewing behavior. Furthermore, although the description herein includes references to specific implementations, the illustrated and/or described implementations can be implemented in any suitable hardware, software, firmware, or combination thereof and using any suitable device architecture(s), television network element(s), threshold value(s), segment monitoring protocol(s), correlation equation(s), and so forth.

As indicated above, implementations for determining program boundaries through viewing behavior may be described in the general context of processor-executable instructions. Generally, processor-executable instructions include routines, programs, protocols, objects, interfaces, components, data structures, etc. that perform and/or enable particular tasks and/or implement particular abstract data types. Determining program boundaries through viewing behavior, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

What is claimed is:

1. One or more processor-accessible storage media encoded with processor-executable instructions that are executed by the processor resulting in actions comprising:
dividing a video stream into a plurality of segments that each correspond to a discrete time unit, a position of a segment in the video stream independent of a correspondence to particular programming portions of the video streams;
monitoring viewing behavior of individual segments of the video stream following the dividing;
calculating correlations between segments responsive to the monitoring; and
determining at least one boundary of the video stream based on the calculated correlations, wherein the action of determining comprises comparing forward and backward correlations of respective segments to one or more thresholds to determine the at least one boundary of the video stream.

2. The one or more processor-accessible storage media as recited in claim 1, wherein the action of monitoring comprises an action of:
   tracking, for a plurality of clients, which segments of the video stream are played.

3. The one or more processor-accessible storage media as recited in claim 1, wherein the action of monitoring comprises an action of:
   tracking, for a plurality of clients, which segments of the video stream are viewed at an accelerated rate.

4. The one or more processor-accessible storage media as recited in claim 1, wherein the action of calculating comprises an action of:
   calculating forward and backward correlations for multiple segments of the video stream based on the monitored viewing behavior.

5. The one or more processor-accessible storage media as recited in claim 1, wherein the action of determining comprises an action of:
   determining a boundary segment that comprises an edge boundary or a commercial boundary of the video stream.

6. The one or more processor-accessible storage media as recited in claim 1, wherein the processor-executable instructions, when executed, direct the device to perform further actions comprising:
   detecting a request from a client to play a portion of the video stream; and
   beginning the portion of the video stream for the client at the determined at least one boundary.

7. The one or more processor-accessible storage media as recited in claim 1, wherein:
   the action of monitoring comprises an action of receiving respective information from respective clients of a plurality of clients, the respective information regarding which segments of the video stream are being played and which segments are being viewed at an accelerated rate at the respective clients; and
   the processor-executable instructions, when executed, direct the device to perform a further action comprising:
   transmitting the determined at least one boundary of the video stream to another plurality of clients.

8. The one or more processor-accessible storage media as recited in claim 1, wherein the discrete time unit is from one second to three minutes and each of the plurality of segments is a same length.

9. A server comprising:
   a program database that is adapted to store a video stream received from a content provider;
   a video stream segmenter that is adapted to divide the video stream into a plurality of segments that each correspond to a discrete time unit, a position of a segment in the video stream independent of a correspondence to particular programming portions of the video stream;
   a segment viewing monitor that is adapted to monitor whether segments of the video stream are being played or are not being played for each client of a plurality of clients;
   a segment playing correlator that is adapted to calculate a backward playing correlation value between a primary segment and a secondary segment that is previous to the primary segment in the segments of the video stream and a forward playing correlation value between the primary segment and a secondary segment that is subsequent to the primary segment in the segments of the video stream, by using viewership information from the segment viewing monitor, wherein a correlation is when a particular client plays both the primary segment and the secondary segment; and
   a boundary determiner that is adapted to determine boundaries in the video stream using information from the segment playing correlator.

10. The server as recited in claim 9, wherein the server comprises at least part of a headend of television-based system.

11. The server as recited in claim 9, wherein the video stream segmenter divides the video stream prior to monitoring whether the segments of video stream are being played or not being played for each client of the plurality of clients.

12. The server as recited in claim 9, wherein a calculation length for the forward correlation and the backward correlation is expressed in units of segments and is selected responsive to an expected duration of a program being measured.

13. The server as recited in claim 9, wherein correlations with respect to each secondary segment are weighted by proximity of the secondary segment to the primary segment being categorized.

14. The server as recited in claim 9, wherein the boundary determiner is further adapted to determine a starting point, an ending point, and commercial boundaries of programs in the video stream.

15. The server as recited in claim 9, wherein the boundary determiner is further adapted to categorize segments as starting segments if the playing thereof is strongly correlated with subsequent segments but not with previous segments.

16. The server as recited in claim 9, wherein the boundary determiner is further adapted to categorize segments as ending segments if the playing thereof is strongly correlated with previous segments but not with subsequent segments.

17. The server as recited in claim 9, wherein the boundary determiner is further adapted to categorize segments as middle segment if the playing thereof is strongly correlated with both previous and subsequent segments.

18. The server as recited in claim 9, wherein the boundary determiner is further adapted to categorize segments as island segments if the playing thereof fails to be strongly correlated with either previous or subsequent segments.

19. The server as recited in claim 18, further comprising:
   a commercial skipper that is adapted to skip commercial portions of the video streams, the commercial portions identified by amalgamating contiguous segments that are categorized as island segments.

20. The server as recited in claim 9, wherein the discrete time unit is from one second to three minutes and a length the discrete time unit is a same length for all of the plurality of segments.

21. An arrangement for determining program boundaries through viewing behavior, the arrangement comprising:
   stream segmentation means for segmenting a video stream into a plurality of segments corresponding to discrete time units, a position of a segment in the video stream independent of a correspondence to particular programming portions of the video stream;
   viewing monitor means for monitoring which segments of the video stream are being requested or not requested by a plurality of users;
   playing correlator means for calculating a forward correlation value and a backward correlation value for segments of the video stream with regard to whether a one of the plurality of users requests a given segment and requests other segments proximal to the given segment, wherein each segment correlation is weighted by a proximity of a one of the other segments to the given segment; and boundary determination means for determining at least one program boundary using the calculated correlations.

22. The arrangement as recited in claim 21, wherein the viewing monitor means comprises:

means for receiving viewing reports from a plurality of client devices, each viewing report indicating whether at least one segment of the video stream was requested by a respective user at a respective client device of the plurality of client devices.

23. The arrangement as recited in claim 21, wherein the viewing monitor means comprises:

means for tracking segments that are requested by respective clients;

means for tracking segments that are not requested by the respective clients; and means for tracking segments that are being requested and viewed at an accelerated rate by the respective clients.

24. The arrangement as recited in claim 21, wherein the boundary determination means comprises:

comparison means for comparing the forward correlation value to a predetermined forward threshold and the backward correlation value to a predetermined backward threshold for each segment of the segments of the video stream.

25. The arrangement as recited in claim 21, wherein the boundary determination means comprises:

categorization means for categorizing the segments of the video stream to identify at least a start segment.

26. The arrangement as recited in claim 25, wherein the categorization means comprises:

comparison means for identifying at least one start segment;

comparison means for identifying at least one end segment;

comparison means for identifying middle segments; and comparison means for identifying island segments.

27. The arrangement as recited in claim 21, wherein the arrangement comprises at least one of (i) one or more processor-accessible media or (ii) at least one device.

28. The arrangement as recited in claim 21, wherein the discrete time units are from one second to three minutes and a length the discrete time units is a same length for all of the plurality of segments.

29. A device that is capable of monitoring a video stream divided into a plurality of contiguous segments of a same length that each corresponds to a discrete time unit in order to detect which segments are being requested or not requested by a plurality of client devices, the device adapted to determine a starting point of a program, an ending point of a program, and a commercial boundary of the segmented video stream based on which segments are being requested or not requested by the client devices, wherein the device is further adapted to:

calculate forward correlations of requests by a one of the plurality of client devices for primary segments with respect to requests by the same one of the plurality of client devices for subsequent secondary segments occurring proximal to and later in time in the video stream than the primary segments;

calculate backward correlations of request by the one of the plurality of client devices for the primary segments with respect to requests by the same one of the plurality of client devices for previous secondary segments occurring proximal to and earlier in time in the video stream than the primary segments; and wherein the forward correlations and the backward correlations are weighted by a proximity of the secondary segments to the primary segments.

30. The device as recited in claim 29, wherein the device is further adapted to compare the forward correlations to a predetermined forward threshold and to compare the backward correlations to a predetermined backward threshold in order to determine segments bounding commercial portions of the segmented video stream; and wherein the device is capable of creating an index of the commercial portions using the segments bounding the commercial portions so that the commercial portions can be skipped during playback of the segmented video stream.

31. The device as recited in claim 29, wherein the device is further adapted to compare the forward correlations to a predetermined forward threshold and to compare the backward correlations to a predetermined backward threshold in order to determine at least one boundary segment.

32. The device as recited in claim 31, wherein the device is further adapted to categorize a segment as a starting segment if the forward correlation thereof is greater than the predetermined forward threshold and if the backward correlation thereof is less than the predetermined backward threshold.

33. A method implemented on a computing device by a processor configured to execute instructions, that when executed by the processor direct the computing device to perform acts comprising:

calculating, by a correlator of the computing device, a backward correlation and a forward correlation for a segment of a video stream with respect to other segments of the video stream and with regard to whether the segments have been played; and categorizing, by a boundary determiner of the computing device, the segment as a starting segment if the forward correlation is high and the backward correlation is low as compared to at least one threshold, wherein the calculating comprises:

calculating the forward correlation using:

$$C_f(S_n) = \sum_{i=1}^{l} \frac{1}{i} C(S_n, S_{n+i}); \text{ and}$$

calculating the backward correlation using:

$$C_b(S_n) = \sum_{i=1}^{l} \frac{1}{i} C(S_n, S_{n-i});$$

wherein $S_n$ represents the primary segment being categorized, l represents a number of secondary segments being considered in the forward or backward direction, and $C(S_n, S_{n+/-i})$ represents a correlation value between segments $S_n$ and $S_{n+/-i}$.

34. The method as recited in claim 33, further comprising:

monitoring viewing of the video stream to track segments that are played and segments that are viewed at an accelerated rate.

35. The method as recited in claim 33, further comprising:

informing a client device that the segment has been identified as the starting segment for a program of the video stream.

36. The method as recited in claim 33, further comprising:
categorizing the segment as an ending segment if the forward correlation is low and the backward correlation is high as compared to the at least one threshold; or
categorizing the segment as a middle segment if the forward correlation is high and the backward correlation is high as compared to the at least one threshold.

37. The method as recited in claim 33, further comprising:
categorizing the segment as an island segment if the forward correlation is low and the backward correlation is low as compared to the at least one threshold; and
amalgamating the island segment with other contiguous island segments to identify an island zone corresponding to a commercial portion of the video stream.

38. The method as recited in claim 33, wherein a length of the segment is from one second to three minutes and the segment is a same length as the other segments.

* * * * *

UNITED STATES PATENT AND TRADEMARK OFFICE
CERTIFICATE OF CORRECTION

| | | |
|---|---|---|
| PATENT NO. | : 7,614,064 B2 | Page 1 of 1 |
| APPLICATION NO. | : 10/923955 | |
| DATED | : November 3, 2009 | |
| INVENTOR(S) | : Daniel J. Zigmond | |

It is certified that error appears in the above-identified patent and that said Letters Patent is hereby corrected as shown below:

In column 14, line 50-54, in Claim 33, delete " $C_b(S_n) = \sum_{i=1}^{l} \frac{1}{i_*} C(S_n, S_{n-i});$ "

and insert -- $C_b(S_n) = \sum_{i=1}^{l} \frac{1}{i} C(S_n, S_{n-i});$ --, therefor.

Signed and Sealed this
Eighth Day of February, 2011

David J. Kappos
*Director of the United States Patent and Trademark Office*